United States Patent
Eshima et al.

(10) Patent No.: US 10,719,756 B2
(45) Date of Patent: Jul. 21, 2020

(54) UHF BAND RFID TAG AND UHF BAND RFID TAGGED ARTICLE

(71) Applicant: Murata Manufacturing Co., Ltd., Nagaokakyo-shi, Kyoto-fu (JP)

(72) Inventors: Kazuki Eshima, Nagaokakyo (JP); Makoto Yasutake, Nagaokakyo (JP); Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/372,682

(22) Filed: Apr. 2, 2019

(65) Prior Publication Data

US 2019/0228283 A1    Jul. 25, 2019

Related U.S. Application Data

(63) Continuation of application No. PCT/JP2017/039409, filed on Oct. 31, 2017.

(30) Foreign Application Priority Data

Nov. 15, 2016  (JP) .................................. 2016-222518
Jun. 30, 2017  (JP) .................................. 2017-129310

(51) Int. Cl.
*G06K 7/08*    (2006.01)
*G06K 19/06*   (2006.01)
(Continued)

(52) U.S. Cl.
CPC ..... *G06K 19/07786* (2013.01); *G06K 19/077* (2013.01); *G06K 19/0723* (2013.01);
(Continued)

(58) Field of Classification Search
USPC .................................................. 235/451, 492
See application file for complete search history.

(56) References Cited

U.S. PATENT DOCUMENTS

2010/0066636 A1  3/2010  Carr
2011/0253795 A1  10/2011  Kato
(Continued)

FOREIGN PATENT DOCUMENTS

JP  H1084214 A     3/1998
JP  2005294627 A   10/2005
(Continued)

OTHER PUBLICATIONS

International Search Report issued for PCT/JP2017/039409, dated Feb. 6, 2018.
(Continued)

*Primary Examiner* — Tuyen K Vo
(74) *Attorney, Agent, or Firm* — Arent Fox LLP (57) ABSTRACT

A UHF band RFID tag with stable communication characteristics when attached to a metal surface. The UHF band RFID tag includes a resin block having a first surface serving as an attaching surface to the metal surface and a second surface opposing the first surface, a substrate on a second surface side of the resin block, a RFIC element mounted on the substrate, and a loop electrode connected to the RFIC element. The loop electrode includes metal bodies provided in the resin block and extending in a direction intersecting the first and second surfaces, a flat plate electrode on a first surface side of the resin block and connecting first ends of the metal bodies, conductor patterns on the second surface side of the resin block and connecting the RFIC element and second ends of metal bodies.

19 Claims, 8 Drawing Sheets

(51) Int. Cl.
   *G06K 19/077*    (2006.01)
   *G06K 19/07*    (2006.01)
   *H01Q 1/22*    (2006.01)
   *H01Q 7/00*    (2006.01)
   *H01Q 1/40*    (2006.01)

(52) U.S. Cl.
   CPC ............. *H01Q 1/2225* (2013.01); *H01Q 1/40* (2013.01); *H01Q 7/00* (2013.01)

(56) References Cited

U.S. PATENT DOCUMENTS

| | | | |
|---|---|---|---|
| 2011/0315774 A1* | 12/2011 | Baba | G06K 19/0772 235/488 |
| 2012/0012658 A1* | 1/2012 | Komiyama | G06K 19/022 235/488 |
| 2012/0187198 A1 | 7/2012 | Kato et al. | |
| 2012/0223148 A1 | 9/2012 | Kato et al. | |
| 2014/0361089 A1 | 12/2014 | Kai | |
| 2016/0140432 A1* | 5/2016 | Lehovetzki | B25B 13/04 235/492 |
| 2017/0026089 A1 | 1/2017 | Kato | |

FOREIGN PATENT DOCUMENTS

| | | |
|---|---|---|
| JP | 2008090813 A | 4/2008 |
| JP | 2010218537 A | 9/2010 |
| JP | 2011205384 A | 10/2011 |
| JP | 5136538 B2 | 2/2013 |
| WO | 2010079830 A1 | 7/2010 |
| WO | 2011111509 A1 | 9/2011 |
| WO | 2013145311 A1 | 10/2013 |
| WO | 2016098379 A1 | 6/2016 |

OTHER PUBLICATIONS

Written Opinion of the International Searching Authority issued for PCT/JP2017/039409, dated Feb. 6, 2018.

* cited by examiner

Fig.15

UHF BAND RFID TAG AND UHF BAND RFID TAGGED ARTICLE

CROSS REFERENCE TO RELATED APPLICATIONS

The present application is a continuation of PCT/JP2017/039409 filed Oct. 31, 2017, which claims priority to Japanese Patent Application No. 2016-222518, filed Nov. 15, 2016, and Japanese Patent Application No. 2017-129310, filed Jun. 30, 2017, the entire contents of each of which are incorporated herein by reference.

TECHNICAL FIELD

The present disclosure relates to an ultra-high frequency (UHF) band radio frequency identification (RFID) tag attached to a metal surface, and a UHF band RFID tagged article.

BACKGROUND

Because a UHF band RFID system is capable of collectively reading a plurality of RFID tags and is also capable of miniaturizing the RFID tags, the UHF band RFID system has been spreading in various fields including retail business.

Conventionally, as this kind of RFID tag, for example, one described in Patent Document 1 (identified below) is known. Specifically, Patent Document 1 discloses a configuration in which a loop electrode is sandwiched between insulating sheets, and the insulating sheets are attached to a metal surface in a tack index manner so that and the loop electrode is oriented perpendicular to the metal surface.

Patent Document 1: Japanese Patent No. 5136538

However, in the configuration of Patent Document 1, there is a problem that relative positions of the metal surface and a loop surface of the loop electrode are unstable due to deterioration of strength of a support member of the insulating sheet over time. When the loop surface is tilted from a state perpendicular to the metal surface, intensity of an electric field induced from a magnetic field generated by the loop electrode decreases, and gain of an antenna decreases. That is, unless the relative relationship between the metal surface and the loop surface is stable, communication characteristics will fluctuate.

SUMMARY OF THE INVENTION

It is an object of the present disclosure to provide a UHF band RFID tag and a UHF band RFID tagged article excellent in stability of communication characteristics.

Thus, according to an exemplary aspect, an ultra-high frequency (UHF) band radio frequency identification (RFID) tag is provided that includes a resin block having a first surface serving as an attaching surface to a metal surface and a second surface opposing the first surface. Moreover, a substrate is provided on a second surface side of the resin block; a radio frequency integrated circuit (RFIC) element mounted on the substrate; and a loop electrode connected to the RFIC element. In this aspect, the loop electrode includes a first metal body and a second metal body provided in the resin block and extending in a direction intersecting the first surface and the second surface; a flat plate electrode provided on a first surface side of the resin block and connecting one end portion of the first metal body and one end portion of the second metal body; a first conductor pattern provided on the second surface side of the resin block and connecting the RFIC element and another end portion of the first metal body; and a second conductor pattern provided on the second surface side of the resin block and connecting the RFIC element and another end portion of the second metal body.

In another aspect, an ultra-high frequency (UHF) band radio frequency identification (RFID) tagged article is provided according to the present disclosure. In this aspect, a UHF band RFID tagged article includes an article having a metal surface and a UHF band RFID tag attached to the metal surface. The UHF band RFID tag includes a resin block having a first surface serving as an attaching surface to the metal surface and a second surface opposing the first surface; a substrate provided on a second surface side of the resin block; a radio frequency integrated circuit (RFIC) element mounted on the substrate; and a loop electrode connected to the RFIC element. In this aspect, the loop electrode includes a first metal body and a second metal body provided in the resin block and extending in a direction intersecting the first surface and the second surface; a flat plate electrode provided on a first surface side of the resin block and connecting one end portion of the first metal body and one end portion of the second metal body; a first conductor pattern provided on the second surface side of the resin block and connecting the RFIC element and another end portion of the first metal body; and a second conductor pattern provided on the second surface side of the resin block and connecting the RFIC element and another end portion of the second metal body. Moreover, the flat plate electrode is connected to the metal surface directly or via a capacitance.

According to the present disclosure, a UHF band RFID tag and a UHF band RFID tagged article excellent in stability of communication characteristics can be achieved.

DETAILED DESCRIPTION

An ultra-high frequency (UHF) band radio frequency identification (RFID) tag according to one exemplary aspect of the present disclosure is a UHF band RFID tag attached to a metal surface that includes including a resin block having a first surface serving as an attaching surface to the metal surface and a second surface opposing the first surface; a substrate provided on a second surface side of the resin block; a radio frequency integrated circuit (RFIC) element mounted on the substrate; and a loop electrode connected to the RFIC element. Moreover, the loop electrode includes: a first metal body and a second metal body provided in the resin block and extending in a direction intersecting the first surface and the second surface; a flat plate electrode provided on a first surface side of the resin block and connecting one end portion of the first metal body and one end portion of the second metal body; a first conductor pattern provided on the second surface side of the resin block and connecting the RFIC element and another end portion of the first metal body; and a second conductor pattern provided on the second surface side of the resin block and connecting the RFIC element and another end portion of the second metal body.

With this configuration, since the first metal body and the second metal body forming the loop electrode are provided in the resin block, a position of a loop surface of the loop electrode can be fixed with respect to the resin block. Therefore, by attaching the resin block to the metal surface, it is possible to stabilize relative positions of the metal surface and the loop surface of the loop electrode. Consequently, stability of communication characteristics can be improved.

It is noted that, preferably, a width of the flat plate electrode is larger than a maximum diameter of the first metal body and the second metal body. With this configuration, it is possible to increase an area of the flat plate electrode, so as to improve strength of the flat plate electrode and reduce specific resistance thereof.

Further, in a plan view as viewed from the first surface side of the resin block, preferably, the RFIC element is disposed in a projection plane of the flat plate electrode. With this configuration, the RFIC element can be protected thermally and electromagnetically by the flat plate electrode.

Further, preferably, an area of the flat plate electrode is substantially same as an area of the first surface of the resin block. With this configuration, it is possible to easily connect the metal surface and the flat plate electrode directly or via a capacitance. In addition, particularly when the metal surface and the flat plate electrode are capacitively coupled, a capacitance value thereof can be maximized. Further, it is also possible to protect the RFIC element and the substrate.

In addition, the first metal body and the second metal body may be a first metal pin and a second metal pin formed by a cylindrical metal ingot.

Further, preferably, the resin block is provided with a through hole penetrating an inside of the loop electrode. With this configuration, since a screw, a magnetic body, or the like can be inserted into the through hole, strength of the resin block can be increased and robustness can be further enhanced.

In addition, an elastic member having conductivity may be connected to the flat plate electrode, and the flat plate electrode may be connected to the metal surface via the elastic member. With this configuration, it is possible to more reliably connect the metal surface and the flat plate electrode and to easily align the metal surface and the flat plate electrode.

Further, for example, a small steel article such as a medical instrument is exposed to a high-temperature environment when performing a sterilization treatment. For this reason, when the RFID tag is attached to the small steel article with an adhesive, there is a possibility that out gas is generated from the adhesive. In addition, when the RFID tag is attached to the small steel article with a rubber tube, it is impossible to sterilize the interior of the rubber tube, and thus sufficient sterilization treatment cannot be performed.

Accordingly, it is preferable to further include a welding member attached to the resin block. With this configuration, an RFID tag can be attached to an article having a metal surface by welding without using an adhesive or a rubber tube.

Further, preferably, the welding member is disposed outside a loop surface of the loop electrode in a side view of the resin block. With this configuration, it is possible to prevent a magnetic field generated from the loop electrode from being blocked by the welding member.

In addition, preferably, the welding member is provided so as to be exposed on a side surface of the resin block. With this configuration, for example, even if the welding member expands due to heat during welding, expansion force can be released from the exposed portion, and damage to the resin block can be suppressed.

Further, preferably, the RFIC element is mounted on the substrate so as to be sandwiched between the second surface of the resin block and the substrate. With this configuration, even if an impact of dropping or the like is applied under high temperature or high humidity, it is possible to make it difficult for a direct stress to be applied to the connecting portion between the RFIC element and the substrate. Consequently, robustness of the RFID tag can be improved. In contrast, in the configuration of Patent Document 1, particularly when an impact of dropping or the like is applied to an article having a metal surface at high temperature or high humidity, the connection portion between the RFIC element and the loop electrode may be damaged, or the RFID tag may be detached from the article, making it impossible to perform communication itself. That is, the configuration of Patent Document 1 has a problem that the robustness of the RFID tag is low. The exemplary embodiments are more robust as a result of the disclosed configurations.

Moreover, an ultra-high frequency (UHF) band radio frequency identification (RFID) tagged article is provided according to one aspect of the present disclosure. In this aspect, a UHF band RFID tagged article includes an article having a metal surface and a UHF band RFID tag attached to the metal surface. Moreover, the UHF band RFID tag includes a resin block having a first surface serving as an attaching surface to the metal surface and a second surface opposing the first surface; a substrate provided on a second surface side of the resin block; a radio frequency integrated circuit (RFIC) element mounted on the substrate; and a loop electrode connected to the RFIC element. Furthermore, the loop electrode includes a first metal body and a second metal body provided in the resin block and extending in a direction intersecting the first surface and the second surface; a flat plate electrode provided on a first surface side of the resin block and connecting one end portion of the first metal body and one end portion of the second metal body; a first conductor pattern provided on the second surface side of the resin block and connecting the RFIC element and another end portion of the first metal body; and a second conductor pattern provided on the second surface side of the resin block and connecting the RFIC element and another end portion of the second metal body. In this aspect, the flat plate electrode is connected to the metal surface directly or via a capacitance.

With this configuration, since the first metal body and the second metal body forming the loop electrode are provided in the resin block, a position of a loop surface of the loop electrode in the resin block can be fixed. Therefore, by attaching the resin block to the metal surface, the relative positions of the metal surface and the loop surface of the loop electrode can be stabilized. Consequently, stability of communication characteristics can also be improved.

Hereinafter, UHF band RFID tags and UHF band RFID tagged articles according to exemplary embodiments will be described with reference to the attached drawings. In the drawings, substantially the same members are denoted by the same reference numerals.

First Embodiment

Figure 1:
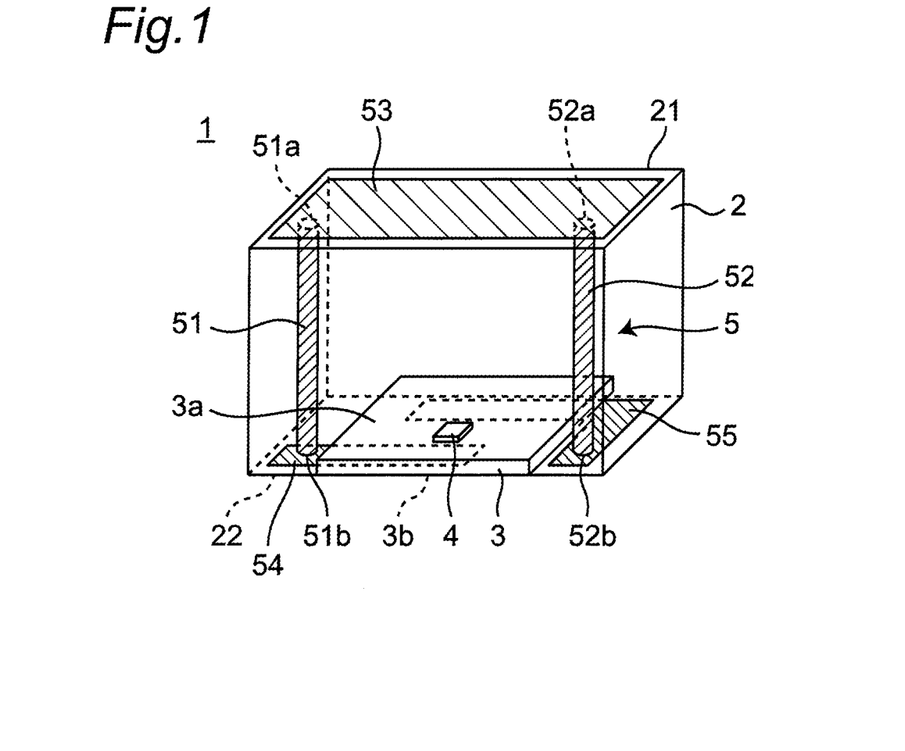
FIG. 1 is a perspective view illustrating a schematic configuration of a UHF band RFID tag according to a first embodiment of the present disclosure, with a resin block being transparent.

FIG. 1 is a perspective view illustrating a schematic configuration of a UHF band RFID tag 1 according to a first embodiment of the present disclosure, with a resin block 2 provided in a UHF band RFID tag 1 being transparent.

As illustrated in FIG. 1, the UHF band RFID tag 1 includes a resin block 2, a substrate 3, a radio frequency integrated circuit (RFIC) element 4, and a loop electrode 5.

The resin block 2 has a first surface 21 serving as an attaching surface to a metal surface and a second surface 22 opposing the first surface 21. The resin block 2 is made of a hard resin material such as epoxy resin, for example. Further, the resin block 2 is formed in, for example, a rectangular parallelepiped shape.

The substrate 3 is provided on the second surface 22 side of the resin block 2. In the first embodiment, the substrate 3 is provided so as to be embedded in the second surface 22 of the resin block 2. The substrate 3 is formed of, for example, a hard resin material such as epoxy resin. Further, the substrate 3 is formed in, for example, a rectangular shape.

The RFIC element 4 is mounted on a first main surface 3a of the substrate 3 so as to be sandwiched between the second surface 22 of the resin block 2 and the substrate 3. The RFIC element 4 is, for example, an RFIC element corresponding to a communication frequency in a 900 MHz band, that is, the UHF band. The RFIC element 4 is connected to the loop electrode 5.

In the exemplary aspect, the loop electrode 5 includes a first metal pin 51 which is an example of a first metal body, a second metal pin 52 which is an example of a second metal body, a flat plate electrode 53, a first conductor pattern 54, and a second conductor pattern 55.

The first metal pin 51 and the second metal pin 52 are, for example, cylindrical metal ingots formed by processing a metal ingot (bulk) into a pin shape. The first metal pin 51 and the second metal pin 52 are embedded in the resin block 2. More specifically, the first metal pin 51 and the second metal pin 52 are embedded in the resin block 2 so as to extend in a direction intersecting (for example, orthogonal or substantially orthogonal to) the first surface 21 and the second surface 22 of the resin block 2. The first metal pin 51 and the second metal pin 52 are provided at positions opposing each other with the substrate 3 interposed therebetween.

Figure 2:
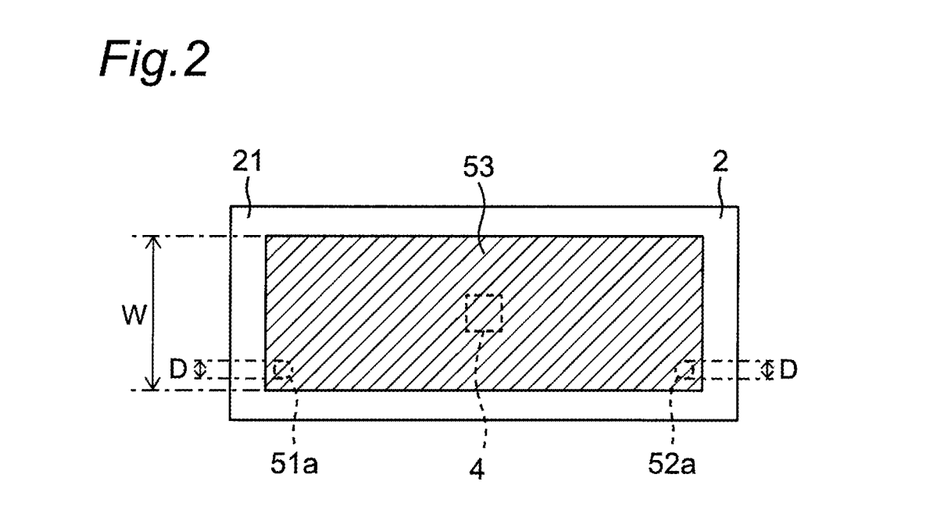
FIG. 2 is a plan view illustrating a schematic configuration of a flat plate electrode.

As illustrated in FIG. 2, the flat plate electrode 53 is provided on the first surface 21 side of the resin block 2 and connects one end portion 51a (i.e., a first end) of the first metal pin 51 and one end portion 52a (i.e., a first end) of the second metal pin 52. The flat plate electrode 53 is formed in, for example, a rectangular shape. In the first embodiment, a width W of the flat plate electrode 53 is formed so as to be larger than a diameter (maximum diameter) D of the first metal pin 51 and the second metal pin 52. Further, in a plan view as viewed from the first surface 21 side of the resin block 2, the RFIC element 4 is disposed in a projection plane of the flat plate electrode 53.

Figure 3:
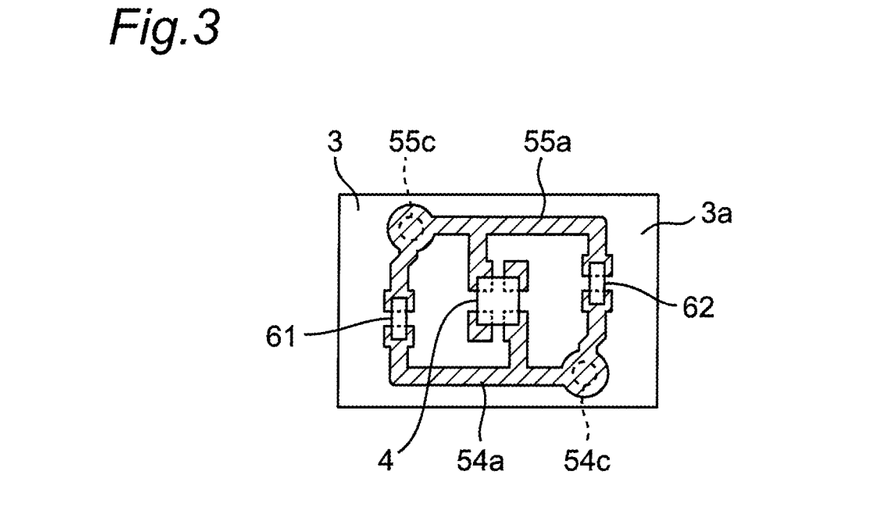
FIG. 3 is a plan view illustrating a first wiring pattern and a second wiring pattern formed on a first main surface of a substrate.
Figure 4:
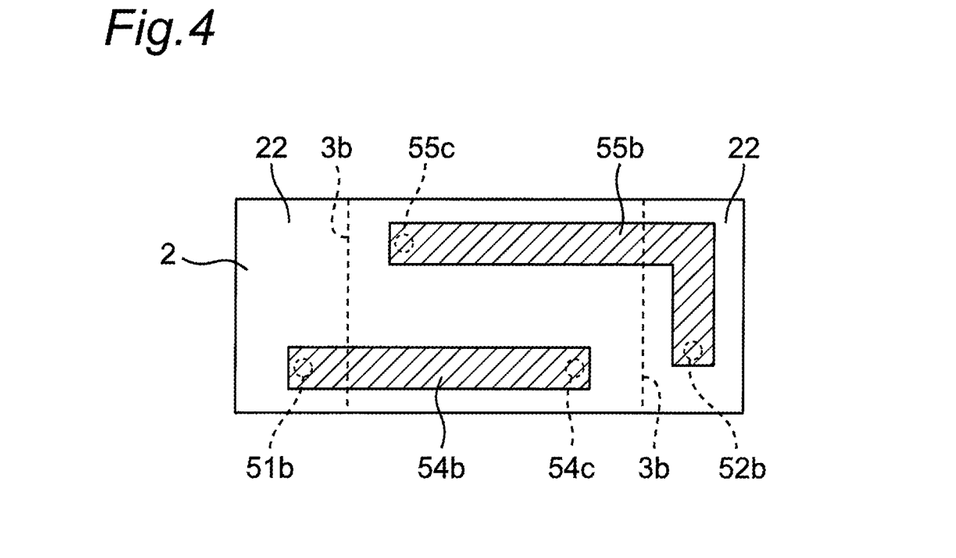
FIG. 4 is a plan view of a third wiring pattern and a fourth wiring pattern formed on a second surface side of the resin block as viewed from a first surface side of the resin block.

FIG. 3 is a plan view illustrating a first wiring pattern 54a and a second wiring pattern 55a formed on the first main surface 3a of the substrate 3. FIG. 4 is a plan view of a third wiring pattern 54b and a fourth wiring pattern 55b formed on the second surface 22 side of the resin block 2 as viewed from the first surface 21 side of the resin block 2.

As illustrated in FIG. 3, the first wiring pattern 54a and the second wiring pattern 55a connected to the RFIC element 4 are formed on the first main surface 3a of the substrate 3. In addition, a first via hole conductor 54c and a second via hole conductor 55c are provided on the substrate 3 so as to penetrate in a thickness direction. The first wiring pattern 54a is connected to a first input/output terminal (not illustrated) of the RFIC element 4 and connected to the first via hole conductor 54c. The second wiring pattern 55a is connected to a second input/output terminal (not illustrated) of the RFIC element 4 and connected to the second via hole conductor 55c.

As illustrated in FIG. 4, the third wiring pattern 54b and the fourth wiring pattern 55b are formed across the second surface 22 of the resin block 2 and the second main surface 3b of the substrate 3. The third wiring pattern 54b is formed so as to connect another end portion 51b (i.e., a second end) of the first metal pin 51 and the first via hole conductor 54c. The fourth wiring pattern 55b is formed so as to connect another end portion 52b (i.e., a second end) of the second metal pin 52 and the second via hole conductor 55c.

In the first embodiment, the first conductor pattern 54 is formed by the first wiring pattern 54a, the third wiring pattern 54b, and the first via hole conductor 54c, and connects the RFIC element 4 and the other end portion 51b of the first metal pin 51. The second conductor pattern 55 is formed by the second wiring pattern 55a, the fourth wiring pattern 55b, and the second via hole conductor 55c, and connects the RFIC element 4 and the other end portion 52b of the second metal pin 52. In FIGS. 1 to 4, hatching is added to only parts forming the loop electrode 5.

On the first main surface 3a of the substrate 3, as illustrated in FIG. 3, chip capacitors 61, 62 connected to the first wiring pattern 54a and the second wiring pattern 55a are mounted. The chip capacitors 61, 62 are disposed in parallel with the RFIC element 4, and the RFIC element 4 is impedance-matched by the loop electrode 5 and the chip capacitors 61, 62. An LC resonance circuit is formed by the loop electrode 5 and the chip capacitors 61, 62.

Figure 5:
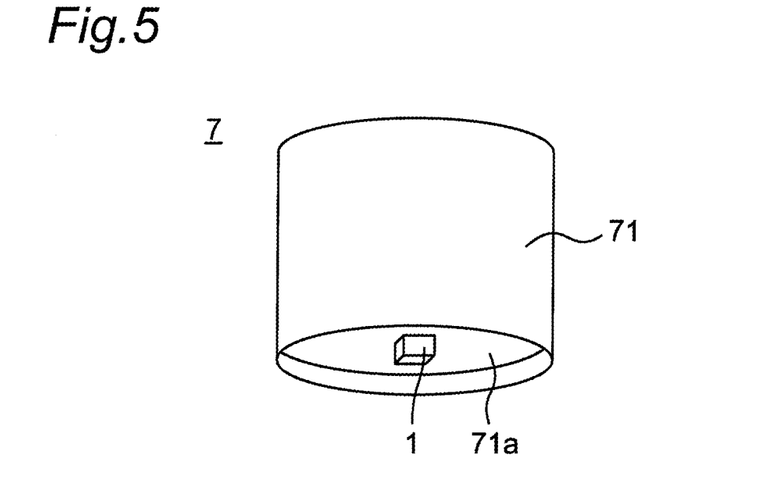
FIG. 5 is a perspective view illustrating a schematic configuration of a UHF band RFID tagged article according to the first embodiment of the present disclosure.
Figure 6:
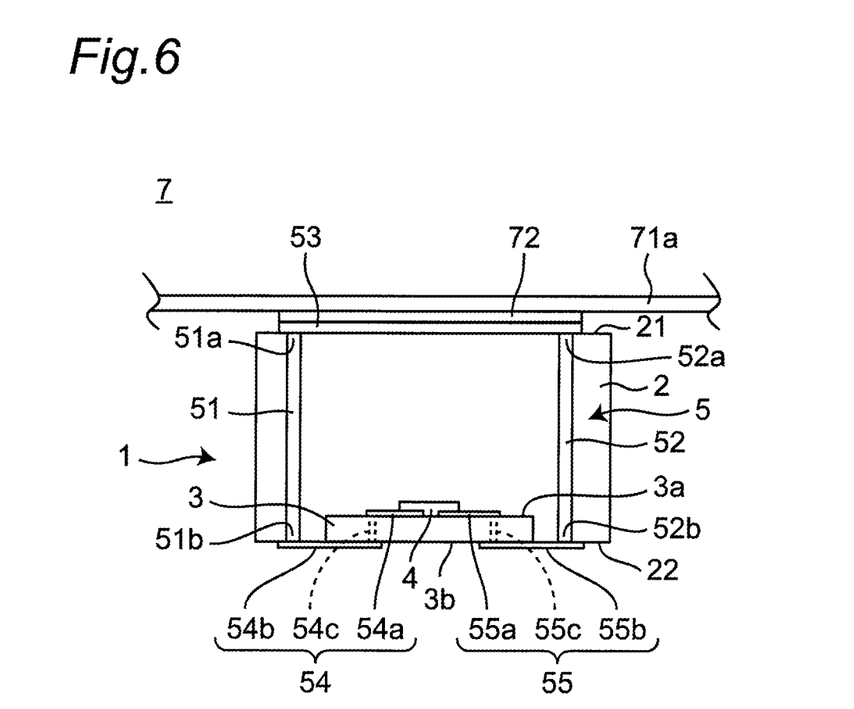
FIG. 6 is a partially enlarged side view of a UHF band RFID tagged article according to the first embodiment of the present disclosure, with the resin block being transparent.

FIG. 5 is a perspective view illustrating a schematic configuration of a UHF band RFID tagged article 7. FIG. 6 is a partially enlarged side view of the UHF band RFID tagged article 7, with the resin block 2 being transparent.

As illustrated in FIG. 5, the UHF band RFID tagged article 7 includes an article 71 having a metal surface 71a and a UHF band RFID tag 1 attached to the metal surface 71a. The article 71 is, for example, a metal can, and the metal surface 71a is a bottom surface or a top surface of the can.

As illustrated in FIG. 6, the UHF band RFID tag 1 is configured to be attached to the metal surface 71a by connecting the flat plate electrode 53 to the metal surface 71a with an adhesive layer 72 interposed therebetween. That is, the flat plate electrode 53 is connected (capacitively coupled) to the metal surface 71a via a capacitance. The UHF band RFID tag 1 uses the metal surface 71a as an emitter.

According to the first embodiment, since the first metal pin 51 and the second metal pin 52 forming the loop electrode 5 are embedded in the resin block 2, a position of a loop surface of the loop electrode 5 in the resin block 2 can be fixed. Therefore, by attaching the resin block 2 to the metal surface 71a, it is possible to stabilize relative positions of the metal surface 71a and the loop surface of the loop electrode 5. Consequently, stability of communication characteristics can be improved.

Further, according to the first embodiment, since the RFIC element 4 is mounted on the substrate 3 so as to be sandwiched between the second surface 22 of the resin block 2 and the substrate 3, even if an impact of dropping or the like is applied under high temperature or high humidity, it is possible to make it difficult for a direct stress to be applied to the connecting portion between the RFIC element 4 and the substrate 3. Consequently, robustness of the RFID tag can be improved. Further, even if another can hits the bottom or top of the can when the cans are stacked, since the RFID tag 1 itself is robust, the function as the RFID tag 1 is hardly impaired.

Further, according to the first embodiment, the width W of the flat plate electrode 53 is formed to be larger than the diameter D of the first metal pin 51 and the second metal pin 52. In this manner, it is possible to increase an area of the flat plate electrode 53, so as to improve strength of the flat plate electrode 53 and reduce specific resistance thereof.

According to the first embodiment, in the plan view as viewed from the first surface 21 side of the resin block 2, the RFIC element 4 is disposed in the projection plane of the flat plate electrode 53. Thus, the RFIC element 4 can be protected thermally and electromagnetically by the flat plate electrode 53.

As described above, since the flat plate electrode 53 is provided in a solid form on a top surface side (the side to which the metal block is attached) of the resin block 2, when the flat plate electrode 53 and the metal surface are directly connected via a conductive joining material such as solder, it is also possible to improve bonding strength between the RFID tag 1 and the metal surface. In addition, when the flat plate electrode 53 and the metal surface are capacitively coupled, a capacitance value thereof can be increased.

It is noted that, preferably, the area of the flat plate electrode 53 is substantially same as an area of the first surface of the resin block 2. With this configuration, it is possible to make it easy to connect the metal surface and the flat plate electrode 53 directly or via a capacitance. In addition, particularly when the metal surface and the flat plate electrode 53 are capacitively coupled, a capacitance value thereof can be maximized. Further, it is possible to protect the RFIC element 4 and the substrate 3.

Second Embodiment

Figure 7:
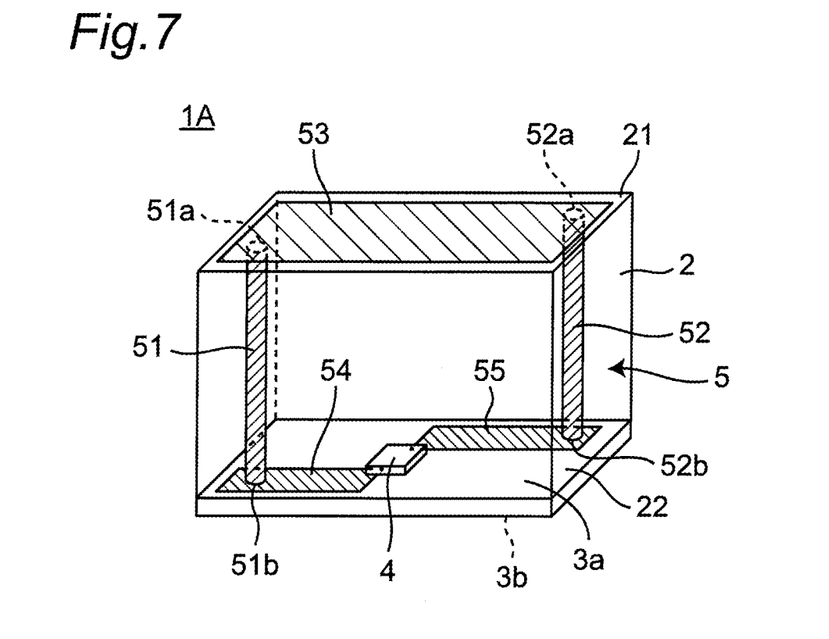
FIG. 7 is a perspective view illustrating a schematic configuration of a UHF band RFID tag according to a second embodiment of the present disclosure, with a resin block being transparent.

FIG. 7 is a perspective view illustrating a schematic configuration of a UHF band RFID tag 1A according to a second embodiment of the present disclosure, with the resin block 2 provided in the UHF band RFID tag 1A being transparent.

The UHF band RFID tag 1A according to the second embodiment is mainly different from the UHF band RFID tag 1 according to the second embodiment in that a substrate 3 is provided along the second surface 22 of the resin block 2. Along with this, the first conductor pattern 54 and the second conductor pattern 55 are formed only on the first main surface 3a of the substrate 3.

Also in the UHF band RFID tag 1A, the RFIC element 4 is mounted on the substrate 3 so as to be sandwiched between the second surface 22 of the resin block 2 and the substrate 3 as further shown. Therefore, even if an impact of dropping or the like is applied under high temperature or high humidity, it is possible to make it difficult for a direct stress to be applied to the connecting portion between the RFIC element 4 and the substrate 3. Consequently, robustness of the RFID tag can be improved.

It is also noted that, as illustrated in FIG. 7, the first metal pin 51 and the second metal pin 52 may be disposed at corner portions apart from each other in a diagonal direction of the resin block 2. However, as illustrated in FIG. 1, disposing the first metal pin 51 and the second metal pin 52 at the corner portions adjacent to each other of the resin block 2 allows increasing lengths of the first conductor pattern 54 and the second conductor pattern 55. Consequently, a length of the loop electrode 5 can be increased.

Third Embodiment

Figure 8:
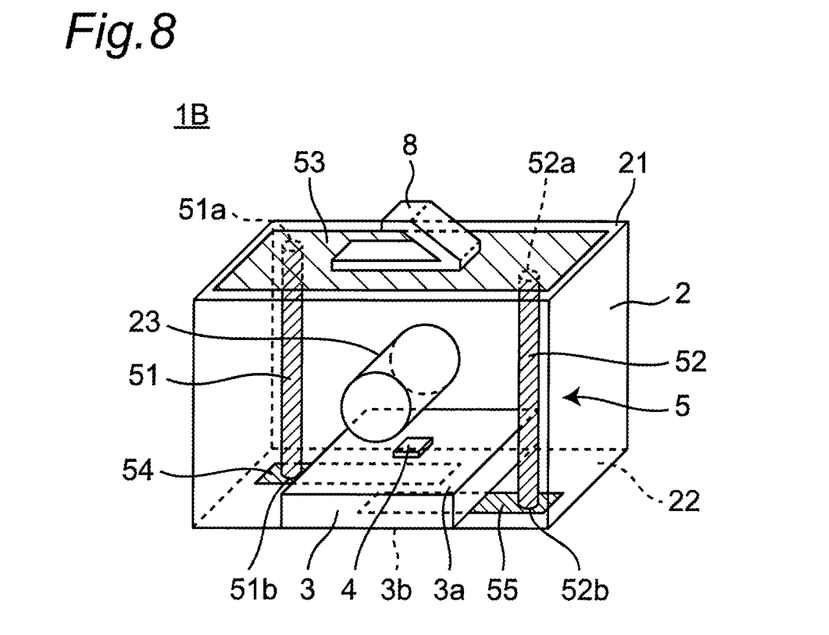
FIG. 8 is a perspective view illustrating a schematic configuration of a UHF band RFID tag according to a third embodiment of the present disclosure, with a resin block being transparent.

FIG. 8 is a perspective view illustrating a schematic configuration of a UHF band RFID tag 1B according to a third embodiment of the present disclosure, with the resin block 2 provided in the UHF band RFID tag 1B being transparent.

The UHF band RFID tag 1B according to the third embodiment is mainly different from the UHF band RFID tag 1 according to the first embodiment in that a through hole 23 is provided in the resin block 2 and an elastic member 8 having conductivity is provided on the flat plate electrode 53.

Figure 9:
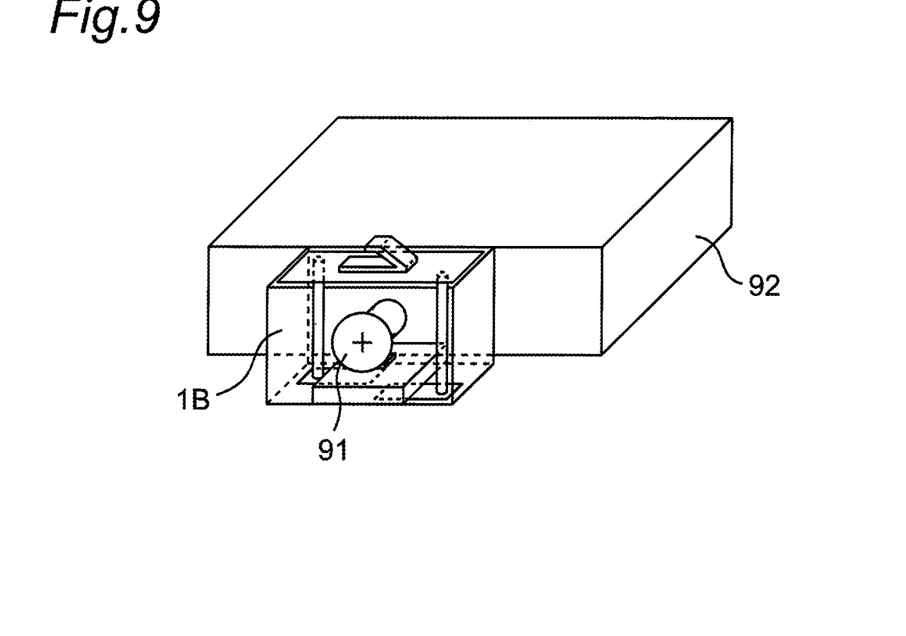
FIG. 9 is a perspective view illustrating a state that the UHF band RFID tag of FIG. 8 is attached to a support body.

As illustrated in FIG. 8, the through hole 23 is provided so as to penetrate an inside of the loop electrode 5. In the through hole 23, for example, a screw 91 is inserted as illustrated in FIG. 9. By screwing a distal end portion of the screw 91 into a support body 92, the UHF band RFID tag 1B can be attached to the support body 92.

Figure 10:
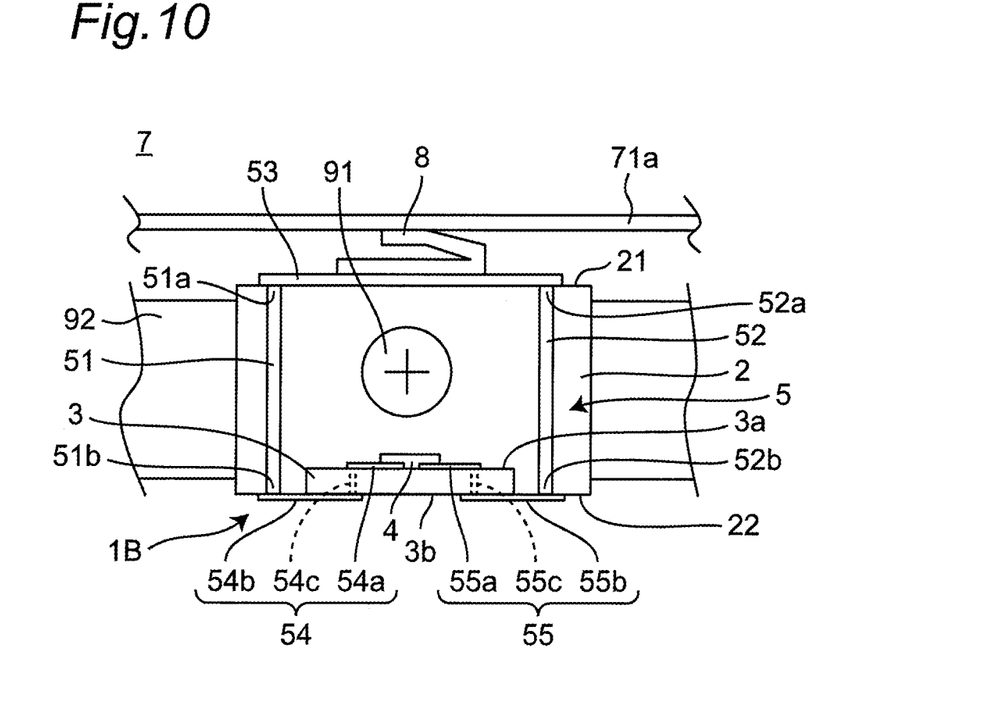
FIG. 10 is a partially enlarged side view of a UHF band RFID tagged article having the UHF band RFID tag of FIG. 8, with the resin block being transparent.

The elastic member 8 is made of, for example, a leaf spring having conductivity. As illustrated in FIG. 10, the UHF band RFID tag 1B is attached to the article 71 (see FIG. 5) so that the elastic member 8 directly contacts the metal surface 71a. Consequently, the flat plate electrode 53 is directly connected to the metal surface 71a via the elastic member 8, not via the capacitance.

According to the third embodiment, since the screw 91 can be inserted into the through hole 23, strength of the resin block 2 can be increased and robustness can be further enhanced.

Further, according to the third embodiment, since the flat plate electrode 53 is connected to the metal surface 71a via the elastic member 8, the metal surface 71a and the flat plate electrode 53 are more reliably connected, and it is possible to easily align the metal surface 71a and the flat plate electrode 53.

It is noted that the present disclosure is not limited to each of the exemplary embodiments, and can be implemented in various other modes. For example, in the above description, as illustrated in FIG. 1, at least a part of the flat plate electrode 53, the first conductor pattern 54, and the second conductor pattern 55 of the UHF band RFID tag 1B is exposed to the outside. However, the present disclosure is not limited thereto. A protective layer may be provided so as to cover the flat plate electrode 53, the first conductor pattern 54, and the second conductor pattern 55. Thus, corrosion and the like of the flat plate electrode 53, the first conductor pattern 54, and the second conductor pattern 55 can be suppressed.

In the above description, as illustrated in FIG. 9, the screw 91 is inserted into the through hole 23, but the present disclosure is not limited thereto. For example, a magnetic material may be inserted into the through hole 23.

Fourth Embodiment

Figure 11:
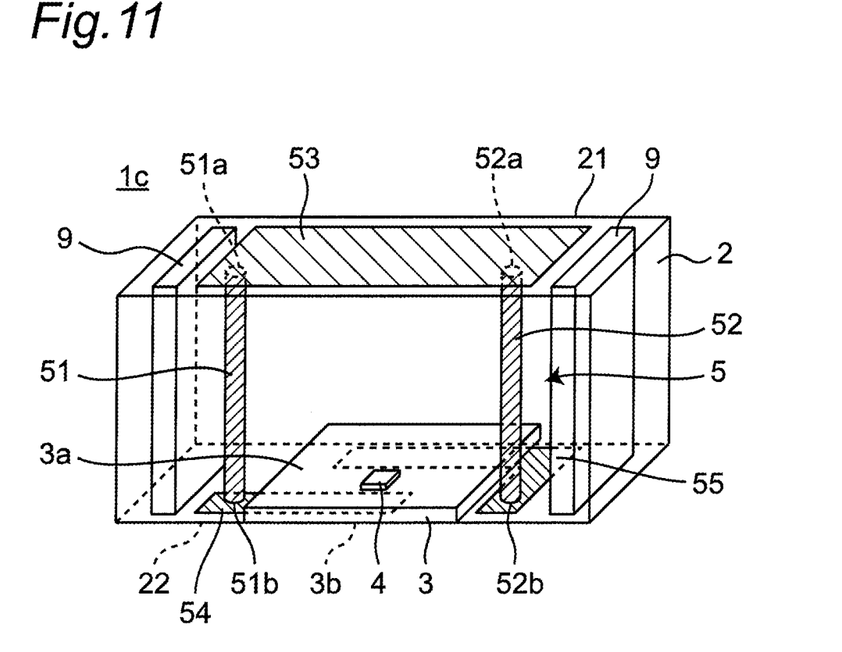
FIG. 11 is a perspective view illustrating a schematic configuration of a UHF band RFID tag according to a fourth embodiment of the present disclosure, with a resin block being transparent.

FIG. 11 is a perspective view illustrating a schematic configuration of a UHF band RFID tag 1C according to a fourth embodiment of the present disclosure, with the resin block 2 provided in the UHF band RFID tag 1C being transparent.

The UHF band RFID tag 1C according to the fourth embodiment is mainly different from the UHF band RFID tag 1 according to the first embodiment in that a welding member 9 is embedded in the resin block 2.

The welding member 9 is formed of a material weldable to a metal such as iron or stainless steel, for example. Further, the welding member 9 is formed in a rectangular plate shape. In the fourth embodiment, the welding member 9 is provided to penetrate the resin block 2 so as to be exposed from the first surface 21 and the second surface 22 of the resin block 2.

Further, the welding member 9 is disposed outside a loop surface of the loop electrode 5 in a side view of the resin block 2 (as viewed from the front side in FIG. 11). It is noted that the term "a loop surface of the loop electrode 5" means a surface (area) surrounded by the first metal pin 51, the second metal pin 52, the flat plate electrode 53, the first conductor pattern 54, and the second conductor pattern 55.

In the fourth embodiment, two welding members 9 are disposed outside the loop surface of the loop electrode 5 in a side view of the resin block 2. The two welding members 9 are disposed in parallel with the first metal pin 51 and the second metal pin 52 in a side view of the resin block and are disposed so as to sandwich them. In this manner, it is possible to reinforce the resin block 2, and even when, for example, pressure is applied from the first surface 21 side of the resin block 2, damage to the RFIC element 4 can be suppressed.

Figure 12:
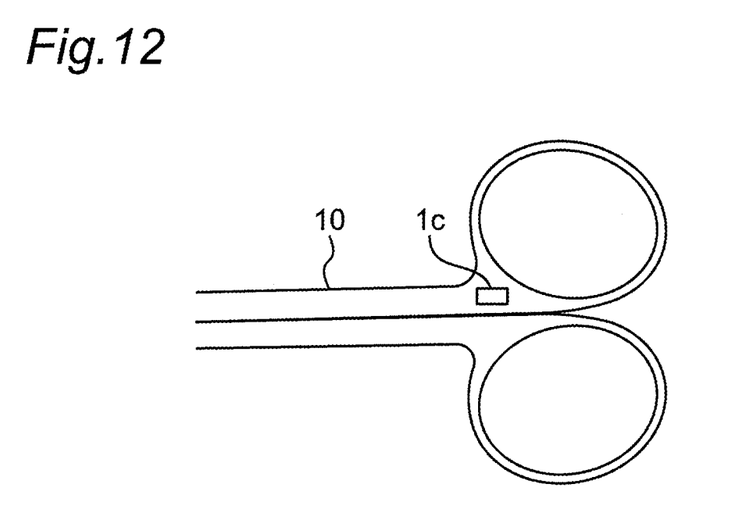
FIG. 12 is a plan view illustrating a state that the UHF band RFID tag of FIG. 11 is welded to a small steel article.

FIG. 12 is a plan view illustrating a state that the UHF band RFID tag 1C is welded onto a small steel article 10 which is an example of an article having a metal surface. For example, in a state that the first surface 21 of the resin block 2 is in contact with a surface of the small steel article 10, a discharge probe, a laser, or the like is placed onto the welding member 9 exposed from the second surface 22 of the resin block 2, so as to melt the welding member 9. Consequently, the UHF band RFID tag 1C and the small steel article 10 can be welded. Examples of a method for welding the UHF band RFID tag 1C and the small steel article 10 include arc welding, resistance welding, and laser welding.

As illustrated in FIG. 12, when the small steel article 10 is a medical instrument, it may be exposed to a high temperature environment for sterilization treatment. When the RFID tag is attached to the small steel article 10 with an adhesive, there is a possibility that out gas is generated from the adhesive. Further, when the RFID tag is attached to the small steel article 10 with a rubber tube, it is impossible to sterilize the interior of the rubber tube, and thus sufficient sterilization treatment cannot be performed.

On the other hand, according to the fourth embodiment, since the welding members 9 are provided, the UHF band RFID tag 1C can be attached by welding to the small steel article 10 without using an adhesive or a rubber tube.

Further, according to the fourth embodiment, since the welding members 9 are disposed outside the loop surface of the loop electrode 5, a magnetic field generated from the loop electrode 5 is prevented from being blocked by the welding members 9.

Note that, preferably, the welding members 9 are made of the same material as that of the small steel article 10. For example, when the material of the small steel article 10 is stainless steel, the materials of the welding members 9 are also preferably stainless steel. Thus, it is possible to make the small steel article 10 and the UHF band RFID tag 1C easier to weld. Note that in this case, it is not necessary that compositions thereof are strictly the same.

In the above description, the welding member 9 is exposed from the first surface 21 and the second surface 22 of the resin block 2, but the present disclosure is not limited thereto. The welding member 9 may not be exposed from the first surface 21 and the second surface 22 of the resin block 2 and may be embedded in the resin block 2.

In the above description, two welding members 9 are embedded in the resin block 2, but the present disclosure is not limited thereto. For example, one or three or more welding members 9 may be embedded in the resin block 2.

In the above description, the first metal pin 51 and the second metal pin 52 are used as examples of the first metal body and the second metal body as members forming the loop electrode 5, but the present disclosure is not limited thereto. The first metal body and the second metal body may be conductive members in forms other than pins. For example, the first metal body and the second metal body may be a via hole conductor or a through hole conductor, or may be a plating film or a metal thin plate (hoop material).

In the above description, a medical instrument has been cited as an example of the small steel article 10, but the present disclosure is not limited thereto. The small steel article 10 may be, for example, a tool, an iron plate, a scaffold for building, a reinforcing bar, or the like.

Figure 13:
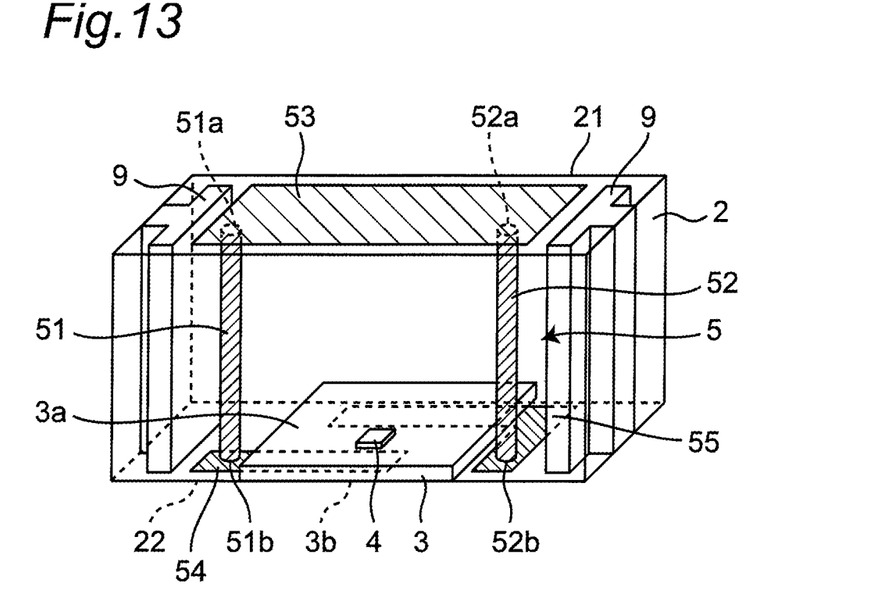
FIG. 13 is a perspective view illustrating a first modification example of the UHF band RFID tag of FIG. 11, with the resin block being transparent.

Further, in the above description, the welding member 9 is formed in a rectangular plate shape, but the present disclosure is not limited thereto. The welding member 9 may have protrusions or recesses. For example, as illustrated in FIG. 13, the welding member 9 may be formed in a T-shaped cross section. With this configuration, it is possible to prevent the welding member 9 from coming out of the resin block 2.

Further, as illustrated in FIG. 13, preferably, the welding member 9 is provided so as to be exposed on a side surface of the resin block 2. With this configuration, for example, even if the welding member 9 expands due to heat during welding, expansion force can be released from the exposed portion, and damage to the resin block 2 can be suppressed.

Figure 14:
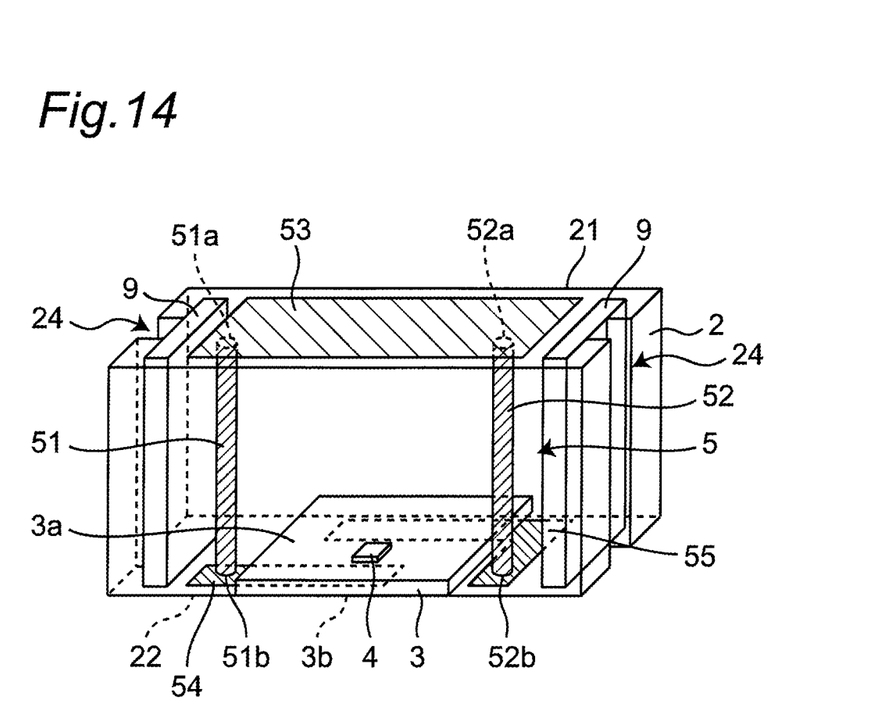
FIG. 14 is a perspective view illustrating a second modification example of the UHF band RFID tag of FIG. 11, with the resin block being transparent.

As illustrated in FIG. 14, a slit (groove) 24 may be provided in the side surface of the resin block 2 so that the welding member 9 is exposed on the side surface of the resin block 2. Even with this configuration, the expansion force of the welding member 9 due to heat during welding can be released from the exposed portion, and damage to the resin block 2 can be suppressed.

Figure 15:
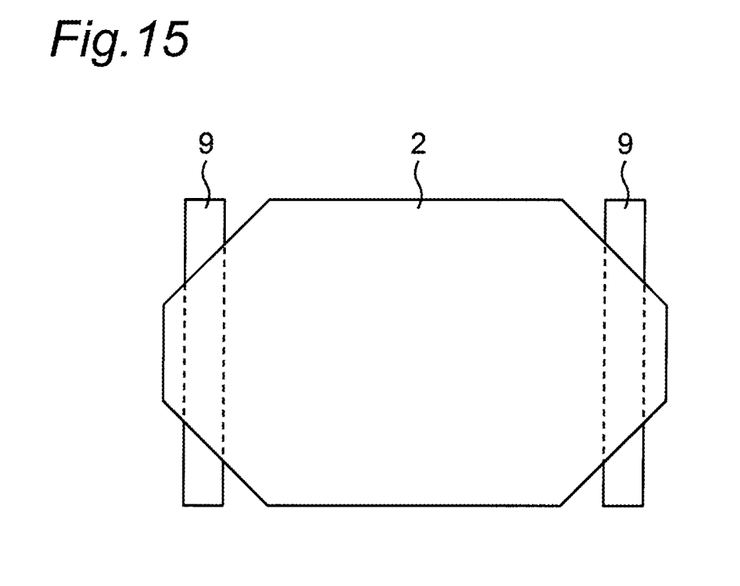
FIG. 15 is a side view illustrating a third modification example of the UHF band RFID tag of FIG. 11.

In addition, as illustrated in FIG. 15, at least one end portion of the welding member 9 may be exposed by chamfering a corner portion of the resin block 2. Even with this configuration, the expansion force of the welding member 9 due to heat during welding can be released from the exposed portion, and damage to the resin block 2 can be suppressed.

In the above description, the welding member 9 is embedded in the resin block 2, but the present disclosure is not limited thereto. The welding member 9 just has to be attached to the resin block 2, and may be, for example, attached so as to fit along an outer surface of the resin block 2.

In the above description, the RFIC element 4 is mounted on the substrate 3 so as to be sandwiched between the second surface 22 of the resin block 2 and the substrate 3, but the present disclosure is not limited thereto. The RFIC element 4 may be mounted on a surface of the substrate 3 opposite to a surface adjacent to the second surface 22 of the resin block 2.

In the above description, the first metal pin 51 and the second metal pin 52 are embedded in the resin block 2, but the present disclosure is not limited thereto. The first metal pin 51 and the second metal pin 52 may be provided in the resin block 2 so as to extend in a direction intersecting the first surface 21 and the second surface 22 of the resin block 2. For example, the first metal pin 51 and the second metal pin 52 may be provided along the outer surface of the resin block 2.

It is to be noted that by combining any embodiments out of the various embodiments as described above, it is possible to achieve the respective effects of the embodiments.

While the present disclosure has been described in each embodiment with a certain degree of detail, the disclosure content of these embodiments should be varied in details of configurations. Further, changes in combinations and orders of elements in each embodiment can be achieved without departing from the scope and spirit of the present disclosure.

According to the exemplary aspects, a UHF band RFID tag is provided that is excellent in stability of communication characteristics, and thus is useful as, for example, a UHF band RFID tag attached to a metal can or similar metal structure, for example.

EXPLANATIONS OF LETTERS OR NUMERALS 1, 1A, 1B, 1C UHF band RFID tag
2 resin block
3 substrate
3a first main surface
3b second main surface
4 RFIC element
5 loop electrode
7 UHF band RFID tagged article
8 elastic member
9 welding member
10 small steel article
21 first surface
22 second surface
23 through hole
24 slit
51 first metal pin
51a one end portion
51b another end portion
52 second metal pin
52a one end portion
52b another end portion
53 flat plate electrode
54 first conductor pattern
54a first wiring pattern
54b third wiring pattern
54c first via hole conductor
55 second conductor pattern
55a second wiring pattern
55b fourth wiring pattern
55c second via hole conductor
61, 62 chip capacitor
71 article
71a metal surface
72 adhesive layer
91 screw
92 support body

The invention claimed is:

1. An ultra-high frequency (UHF) band radio frequency identification (RFID) tag, comprising:
    a resin block having a first and second surfaces that oppose each other;
    a substrate disposed on a second surface side of the second surface of the resin block;
    a radio frequency integrated circuit (RFIC) element mounted on the substrate; and
    a loop electrode connected to the RFIC element and including:
        first and second metal bodies disposed in the resin block and extending between the first and second surfaces of the resin block;
        a flat plate electrode disposed on a first surface side of the first surface of the resin block and connected to respective first ends of each of the first and second metal bodies;
        a first conductor pattern disposed on the second surface side of the resin block and connecting the RFIC element to a second end of the first metal body opposite the respective first end; and
        a second conductor pattern disposed on the second surface side of the resin block and connecting the RFIC element to a second end of the second metal body opposite the respective first end,
    wherein the resin block comprises a through hole that penetrates an inside of the loop electrode.

2. The UHF band RFID tag according to claim 1, wherein the flat plate electrode comprises a width that is larger than a maximum diameter of the first metal body and the second metal body.

3. The UHF band RFID tag according to claim 1, wherein the RFIC element is disposed in a projection plane of the flat plate electrode in a plan view from the first surface side of the resin block.

4. The UHF band RFID tag according to claim 1, wherein the flat plate electrode comprises an area equal to an area of the first surface of the resin block.

5. The UHF band RFID tag according to claim 1, wherein the first and second metal bodies are each metal pins formed by a cylindrical metal ingot.

6. The UHF band RFID tag according to claim 1, wherein the RFIC element is mounted on the substrate so that the RFIC element is sandwiched between the second surface of the resin block and the substrate.

7. The UHF band RFID tag according to claim 1, the first and second metal bodies are disposed on opposing side surfaces of the substrate in a planar view of the second surface of the resin block and extend in a thickness direction of the resin block.

8. The UHF band RFID tag according to claim 7, wherein the resin block comprises a through hole that penetrates the resin block in a direction orthogonal to the thickness direction and extends between the first and second metal bodies.

9. An ultra-high frequency (UHF) band radio frequency identification (RFID) tag comprising:
   a resin block having a first and second surfaces that oppose each other;
   a substrate disposed on a second surface side of the second surface of the resin block;
   a radio frequency integrated circuit (RFIC) element mounted on the substrate;
   a loop electrode connected to the RFIC element and including:
      first and second metal bodies disposed in the resin block and extending between the first and second surfaces of the resin block,
      a flat plate electrode disposed on a first surface side of the first surface of the resin block and connected to respective first ends of each of the first and second metal bodies,
      a first conductor pattern disposed on the second surface side of the resin block and connecting the RFIC element to a second end of the first metal body opposite the respective first end, and
      a second conductor pattern disposed on the second surface side of the resin block and connecting the RFIC element to a second end of the second metal body opposite the respective first end; and
   a conductive elastic member connected to the flat plate electrode, such that the flat plate electrode is configured to be connected to a metal surface of an article via the elastic member.

10. An ultra-high frequency (UHF) band radio frequency identification (RFID) tag comprising:
    a resin block having a first and second surfaces that oppose each other;
    a substrate disposed on a second surface side of the second surface of the resin block;
    a radio frequency integrated circuit (RFIC) element mounted on the substrate;
    a loop electrode connected to the RFIC element and including:
       first and second metal bodies disposed in the resin block and extending between the first and second surfaces of the resin block,
       a flat plate electrode disposed on a first surface side of the first surface of the resin block and connected to respective first ends of each of the first and second metal bodies,
       a first conductor pattern disposed on the second surface side of the resin block and connecting the RFIC element to a second end of the first metal body opposite the respective first end, and
       a second conductor pattern disposed on the second surface side of the resin block and connecting the RFIC element to a second end of the second metal body opposite the respective first end; and
    a welding member attached to the resin block.

11. The UHF band RFID tag according to claim 10, wherein the welding member is disposed outside a loop surface of the loop electrode in a side view of the resin block.

12. The UHF band RFID tag according to claim 10, wherein the welding member is exposed on a side surface of the resin block.

13. A radio frequency identification (RFID) tag, comprising:
    a resin block having a first and second planar surfaces that oppose each other;
    a substrate disposed on an internal side of the second planar surface of the resin block;
    a radio frequency integrated circuit (RFIC) element mounted on a side of the substrate facing the first planar surface; and
    a loop electrode coupled to the RFIC element and including:
       a flat plate electrode disposed on the first surface of the resin block;
       first and second conductor pattern coupled to first and second input/output terminals of the RFIC element, respectively; and
       first and second metal bodies disposed in the resin block and connecting the flat plate electrode to the first and second conductor patterns to form the loop electrode, respectively,
    wherein the resin block comprises a through hole that penetrates an inside of the loop electrode.

14. The RFID tag according to claim 13, wherein the first and second conductor patterns are disposed on a second surface side of the resin block.

15. The RFID tag according to claim 13, wherein the RFIC element is configured to transmit data in the ultra-high frequency (UHF) band via the loop electrode.

16. The RFID tag according to claim 13, wherein the flat plate electrode comprises a width that is larger than a maximum diameter of the first metal body and the second metal body.

17. The RFID tag according to claim 13, wherein the RFIC element is disposed in a projection plane of the flat plate electrode in a plan view from the first surface of the resin block.

18. The RFID tag according to claim 13, wherein the flat plate electrode comprises an area equal to an area of the first surface of the resin block.

19. An ultra-high frequency (UHF) band radio frequency identification (RFID) tagged article including an article having a metal surface with a UHF band RFID tag attached thereto, wherein the UHF band RFID tag includes:
    a resin block having a first surface configured to attach to the metal surface and a second surface opposing the first surface;
    a substrate disposed on a second surface side of the second surface of the resin block;
    a radio frequency integrated circuit (RFIC) element mounted on the substrate; and
    a loop electrode connected to the RFIC element and including:
       first and second metal bodies disposed in the resin block and extending between the first and second surfaces of the resin block;

a flat plate electrode disposed on a first surface side of the first surface of the resin block and connecting to respective first ends of the first and second metal bodies;

a first conductor pattern disposed on the second surface side of the resin block and connecting the RFIC element to a second end of the first metal body opposite the respective first end; and a second conductor pattern disposed on the second surface side of the resin block and connecting the RFIC element to a second end of the second metal body opposite the respective first end, wherein the flat plate electrode is connected to the metal surface directly or via a capacitance, and wherein the resin block comprises a through hole that penetrates an inside of the loop electrode.

\* \* \* \* \*